United States Patent Office 3,500,119
Patented Mar. 10, 1970

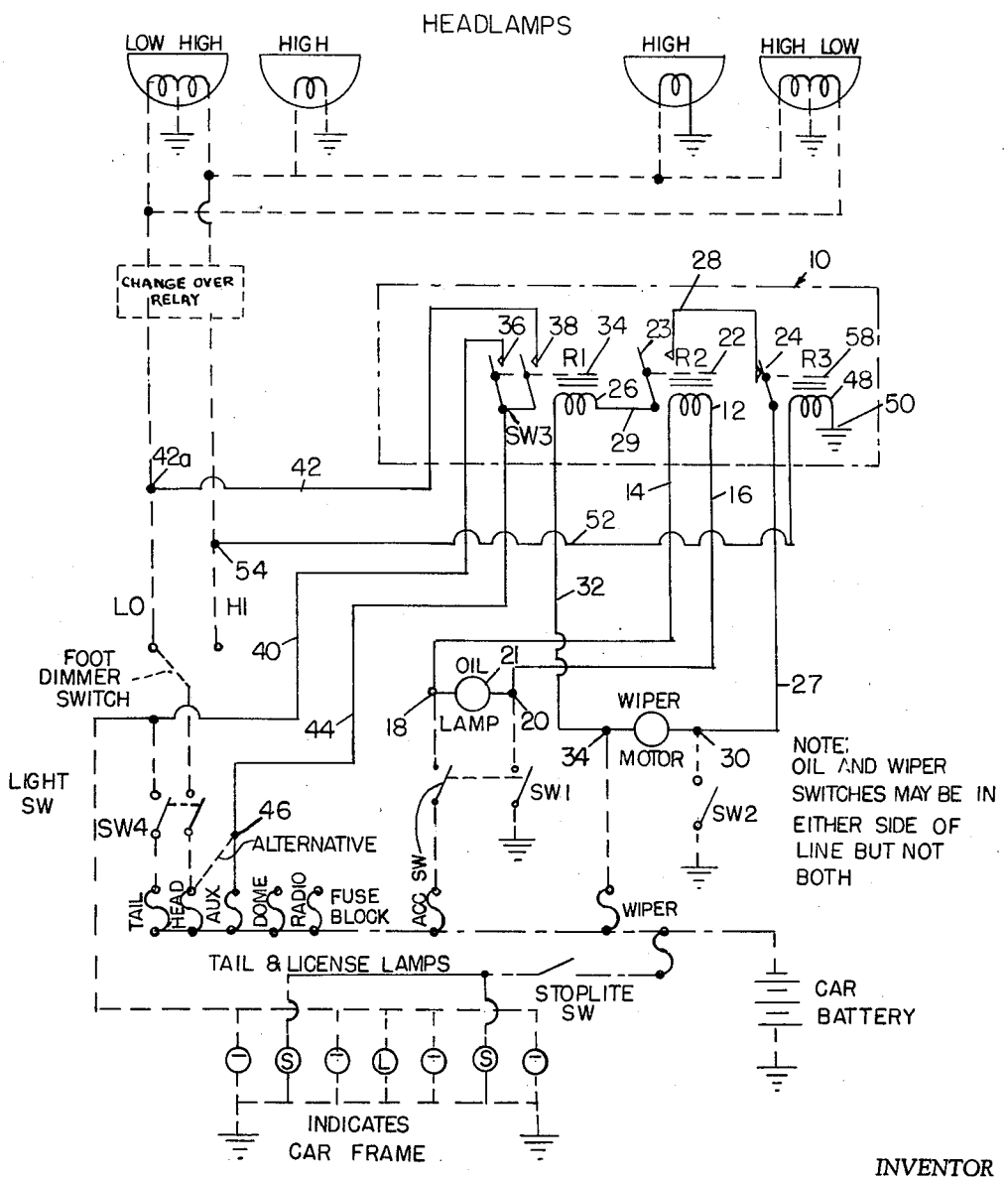

3,500,119
AUTOMATIC HEADLIGHT CONTROL SYSTEM
INCLUDING WINDSHIELD WIPER MOTOR
Kenneth Price, 7301 6th Ave. N.,
St. Petersburg, Fla. 33710
Filed Jan. 31, 1967, Ser. No. 612,924
Int. Cl. B60g 1/02
U.S. Cl. 315—82                                                     7 Claims

ABSTRACT OF THE DISCLOSURE

The disclosed embodiment of the present invention is an automatic headlight switching circuit for an automobile electrical system which is responsive to the operation of the wiper motor, the ignition switch, and the headlight dimmer switch for controlling the energization of the low beam headlights and tail lights. The disclosed switching circuit includes a switching relay which is connected in a series circuit with a normally open contact and a normally closed contact, which series circuit is connected in parallel with the wiper motor. The normally open contact is operated by a relay connected to the ignition switch and the normally closed contact is operated by a relay connected to the dimmer switch. The switching relay includes a first normally opened contact connected between the automobile battery and the low beam headlight circuit and a second normally opened contact connected between the battery and the tail light circuit.

---

A circuit for automatically turning on the driving lights of a car responsive to operation of a windshield wiper independently of manual operation of high beam of head lights.

This invention relates to safety circuits in electrical systems as applied to car ignition systems, lighting systems and the like.

Laws of certain states require the low beam automobile headlights to be turned on during daylight rain as a safety precaution, so that the oncoming motorist may better see his opponent for the right of way. Many motorists do not realize the reason for the law, and either do not turn the lights on, or turn on the wrong beam, blinding the other on-coming driver, or use ineffective parking lights. Others who do turn on the proper beam, often forget to turn them off after parking, and are unable to start again their car because of a rundown battery.

There have been various safety devices and circuits on the market for automatically turning off headlights when an ignition key is turned to the "off" position in a car ignition system, and various other types of automatic lighting systems for vehicles. None of these devices, so far as is known to applicant, solve the above problems of applicant's new safety relay switching system in a car ignition system.

The above problem is solved by a unique relay safety circuit which automatically turns the tail lights and the low beams of the headlights to "on" condition when the windshield wiper motor is manually turned on during travel of the car.

A primary object of the instant invention is to provide a safety switching circuit for turning on the driving lights of a car which is responsive to the operation of a windshield wiper.

A further object of this invention is to provide a safety switching circuit for turning on the lights of a car during daytime travel through rain which is cheap to make, dependable and may be easily installed as an integral part of a conventional car lighting and ignititon system as an integral accessory therefor or be incorporated in the original ignition system of newly manufactured cars.

These and other objects of the instant invention will become apparent from the following description, reference being had to the accompanying drawing wherein a preferred embodiment of the invention is clearly shown.

In the drawing:

The figure of the drawing is a wiring diagram illustrating the new relay safety circuit of the present invention as embodied in an ignition system of a vehicle.

The circuitry of a conventional lighting system is indicated in broken lines of the drawing. The circuitry of the present invention in the drawing is indicated in full lines.

The relays of the present invention are comprised of relays R1, R2 and R3.

Referring to the wiring diagram of the present invention, the relays of the circuit may be housed in a convenient enclosure 10 indicated in broken lines. Enclosure 10 may be secured to the fire wall (not shown) of a car or other convenient place as desired.

The coil 12 of relay R2 is connected by leads 14 and 16 to connections 18 and 20, respectively, of an oil pressure indicator lamp 21 which is energized by switch SW1 of a conventional ignition switch (not shown).

When relay winding 12 is energized while cranking engine, armature 22 of relay R2 closes contact 23 of relay R2. When contact 23 of relay R2 is closed winding 26 of relay R1 is energized when switch SW2 of the wiper motor is closed and connected by lead 27 to contact 24 which is further connected by lead 28 to contact 23 which is connected by lead 29 to coil 26 of relay R1. Lead 27 is connected to point 30. Coil 26 is further connected by lead 32 to connection 34 of wiper motor. When coil 26 of relay R1 is energized as above, armature 34 closes switch SW3 contacts 36 and 38 connected to leads 40 and 42, respectively. Lead 44 is connected to connection 46 to auxiliary fuse of the conventional fuse block or an independent fuse and switch SW3. Lead 42 connects contact 38 of switch SW3 to connection 42a of the low beam of the headlights.

When switch SW3 is closed on contacts 36 and 38, the tail lights are energized by leads 40 and 44 and the low beam of the headlights are energized through leads 42 and 44 when the conventional electrical wiper motor is energized through switch SW2 and switch SW1 is closed while the motor of the car is running. Should either switch SW1 or SW2 be opened then, of course, relays R2 and R1 would not be energized and the low beam of the headlights and the tail lights of the car would not be energized. In other words, relay R1 will not be energized to turn the headlights and tail lights on until switch SW2 of the conventional wiper motor is closed.

Relay coil 48 is grounded at 50 and is further connected by lead 52 to connection 54 of the high beam of the headlights. Should the operator of the car close the foot dimmer switch on the high beam of the lights and manually close light switch SW4, then of course, winding 48 of relay R3 would be energized through lead 52 and ground 50, which would energize coil 48 to actuate armature 58 to open contact 24 and break the circuit through coil 26 of relay R1 de-energizing the low beam of the headlights.

The instant relay circuit allows manual operation of the car headlights and tail lights during night driving and also manual operation of the wiper motor during rainy night driving without interference of the relay circuits.

One of the points of novelty of this new relay circuit is that its operation does not interfere with manual operation of the high beam of the headlights or manual operation of the wiper motor during rainy night driving.

Thus, relay R1 contacts are connected across the car light switch and dimmer switch, operating the low beam headlights and tail lights in parallel with the normal light switch. Relay R2 is energized through the accessory or ignition switch SW1 receiving its operating voltage from the contacts 18 and 20 of the oil lamp.

In the instant new relay circuit, a switching relay (R1) is connected across the voltage connections of a windshield wiper motor. The wiper motor is manually energized by switch SW2. Switching relay R1 has a two-pole double-throw switch SW3 operated by armature 34 to close contacts 36 and 38 connected to lead 44 to energize the tail lights by lead 40 and the low beam of the head lights by lead 42. The operation of the switching relay R1 is subject to two conditions, namely, that the motor is running and/or the oil pressure indicator lamp is energized and to the other condition, namely, that the high beams of the lights not be turned on or energized. These two control conditions of operation are accomplished in operation of the circuit by having two relays, R2 and R3, with contacts in series in the energizing coil of the switching relay R1 to control the operation of relay R1 in accordance with the above operating conditions of a lighting and ignition system of a car.

OPERATION

Under normal daylight driving relay R2 is energized when the conventional ignition or accessory switch is closed to start the engine of the car. Relay R1 is not operative until the wiper motor is manually energized through switch SW2. When relay R1 is energized it operates switch SW3 to close contacts 36 and 38 to energize the low beams of the headlights and the tail lights during rainy day light driving for safety reasons and as often required by state law.

It is to be understood that the instant circuit is not limited to the contacts as herein shown in connection with a conventional car ignition system, but additional provision may be made within the purview of this invention to additionally provide for operating the switching with a solid state circuit or with neutral or park positions on automatic transmissions, or a manual or other automatic switch means may be employed as a controlling circuit means as desired.

From the foregoing it will now be seen that there is herein provided a new and improved safety relay control circuit for automatically turning on the low beam of headlights when an elecrtic windshield motor is energized, which accomplishes all the objects of this invention during use, and others, including many advantages of great practical utility and commercial importance.

I claim:

1. In combination with an automobile electrical system including a source of voltage, an ignition switch, a headlight dimmer switch, a wiper motor, and a pair of headlights having a low beam circuit, an automatic headlight switching circuit, comprising first switching means including energization means and means responsive to said energization means for connecting the source of voltage to the low beam circuit of the pair of headlights; second switching means including energization means responsive to the operation of the ignition switch and connecting means responsive thereto; third switching means including energization means responsive to the operation of the dimmer switch and connecting means responsive thereto; means connecting said energization means of said first switching means, said connecting means of said second switching means, and said connecting means of said third switching means in a series circuit; and means connecting said series circuit in parallel with the wiper motor.

2. The combination as defined in claim 1, wherein said electrical system includes a pair of tail lights, and wherein said connecting means of said first switching means includes means responsive to the energization means of said first switching means for connecting the source of voltage to the pair of tail lights.

3. In combination with an automobile electrical system including a source of voltage, an ignition switch, a headlight dimmer switch, a wiper motor, and a pair of headlights having a low beam circuit, an automatic headlight switching circuit, comprising a first relay having a first pair of normally open contacts connected from said source of voltage to the low beam circuit of the pair of headlights; a second relay having a winding connected to the ignition switch and having switch contacts connected in series with a winding of said first relay; a third relay having a winding connected to the headlight dimmer switch and having switch contacts connected in series with the winding of said first relay; the series connected winding of said first relay, switch contacts of said second relay, and switch contacts of said third relay being connected in parallel with the wiper motor.

4. The combination as defined in claim 3, wherein said electrical system includes a pair of tail lights, and wherein said first relay includes a second pair of normally open contacts connected from said source of voltage to the tail lights.

5. The combination as defined in claim 3, wherein the pair of headlights includes a high beam circuit, and wherein the switch contacts of said third relay are normally closed and the winding of said third relay is connected to the high beam circuit of said headlights.

6. The combination as defined in claim 3, wherein the switch contacts of said second relay are normally open and the winding of said second relay is connected to a contact of the ignition switch which is closed during operation of an associated automobile.

7. The combination as defined in claim 3, wherein the pair of headlights includes a high beam circuit, and wherein the switch contacts of said third relay are normally closed and the winding of said third relay is connected to the high beam circuit of said headlights and the switch contacts of said second relay are normally open and the winding of said second relay is connected to a contact of the ignition switch which is closed during operation of an associated automobile.

References Cited

UNITED STATES PATENTS

| 1,909,072 | 5/1933 | Prescott | 315—83 |
| 2,464,847 | 3/1949 | Coffey | 15—250.12 X |
| 2,598,056 | 5/1952 | Hollins | 315—82 X |
| 2,644,152 | 6/1953 | Ginsberg | 315—77 X |
| 2,925,945 | 2/1960 | Jackson | 223—70 |
| 3,058,142 | 10/1962 | Pollock | 15—250.02 |

JAMES W. LAWRENCE, Primary Examiner

P. C. DEMEO, Assistant Examiner

U.S. Cl. X.R.

15—250